(12) United States Patent
Santos et al.

(10) Patent No.: US 12,378,443 B2
(45) Date of Patent: *Aug. 5, 2025

(54) SILICONE ELASTOMER COMPOSITIONS

(71) Applicant: DOW SILICONES CORPORATION, Midland, MI (US)

(72) Inventors: Elizabeth M. Santos, Midland, MI (US); Eric Joffre, Midland, MI (US); Devin Ferguson, Midland, MI (US); Dongchan Ahn, Midland, MI (US); Scott D. Boelter, Midland, MI (US)

(73) Assignee: DOW SILICONES CORPORATION, Midland, MI (US)

(*) Notice: Subject to any disclaimer, the term of this patent is extended or adjusted under 35 U.S.C. 154(b) by 295 days.

This patent is subject to a terminal disclaimer.

(21) Appl. No.: 18/012,188

(22) PCT Filed: Jun. 23, 2021

(86) PCT No.: PCT/US2021/038651
§ 371 (c)(1),
(2) Date: Dec. 21, 2022

(87) PCT Pub. No.: WO2021/262830
PCT Pub. Date: Dec. 30, 2021

(65) Prior Publication Data
US 2023/0303891 A1    Sep. 28, 2023

Related U.S. Application Data

(60) Provisional application No. 63/043,371, filed on Jun. 24, 2020.

(51) Int. Cl.
*C09J 7/30* (2018.01)
*C09J 7/25* (2018.01)
*C09J 11/06* (2006.01)

(52) U.S. Cl.
CPC . *C09J 7/30* (2018.01); *C09J 7/25* (2018.01); *C09J 11/06* (2013.01); *C09J 2301/408* (2020.08); *C09J 2469/006* (2013.01); *C09J 2483/00* (2013.01)

(58) Field of Classification Search
CPC ... C09J 183/04; C09J 5/00; C09J 11/04; C09J 11/06; C09J 11/08; C09J 2400/266; C09J 2483/00; C09J 7/30; C09J 7/25; C09J 2301/408; C09J 2469/006; B60R 21/235; B60R 2021/23509; B60R 2021/23514; C08L 83/04; C08G 77/12; C08G 77/14; C08G 77/18; C08G 77/20; C08K 3/26; C08K 3/34; C08K 5/56; C09D 183/04
See application file for complete search history.

(56) References Cited

U.S. PATENT DOCUMENTS

| | | |
|---|---|---|
| 3,419,593 A | 12/1968 | Willing |
| 3,715,334 A | 2/1973 | Karstedt |
| 3,814,730 A | 6/1974 | Karstedt |
| 3,989,667 A | 11/1976 | Lee et al. |
| 4,742,103 A | 5/1988 | Morita et al. |
| 6,201,092 B1 | 3/2001 | Hara |
| 6,605,734 B2 | 8/2003 | Roy et al. |
| 7,429,636 B2 | 9/2008 | Asch et al. |
| 2010/0144960 A1* | 6/2010 | Cray ............ C08L 101/02 524/588 |
| 2010/0255205 A1 | 10/2010 | Cray et al. |
| 2012/0245272 A1* | 9/2012 | Dent ............ C08G 77/50 524/502 |
| 2012/0309921 A1 | 12/2012 | Taniguchi et al. |
| 2021/0317335 A1* | 10/2021 | Felder ............ C08L 83/06 |

FOREIGN PATENT DOCUMENTS

| | | |
|---|---|---|
| CN | 101258209 A | 9/2008 |
| CN | 101517002 A | 8/2009 |
| JP | 2012082300 A | 4/2012 |
| KR | 20150050401 A | 5/2015 |
| WO | 2015116776 A1 | 8/2015 |
| WO | 2020053357 A1 | 3/2020 |
| WO | 2020131369 A1 | 6/2020 |

OTHER PUBLICATIONS

Li T.L. et al., "Study on corrosion resistance of γ-aminopropyl methyldimethoxysilane modified epoxy coatings", Dec. 31, 2018, Silicone Materials, vol. 3, No. 5., pp. 367-372 [cited as "A" reference; copy not available].
Cai, Guoping et al., "Synthesis of terminal Si—H irregular tetra-branched star polysiloxanes. Pt-catalyzed hydrosilylation with unsaturated epoxides. Polysiloxane films by photo-acid catalyzed crosslinking", Apr. 27, 2004, Polymer, vol. 45, No. 9., pp. 2941-2948.
Machine assisted English translation of JP2012082300A obtained from <https://patents.google.com/patent> on Dec. 2, 2024, 14 pages.
International Search Report for PCT/US2021/038651 dated Oct. 12, 2021, 3 pages.
Machine assisted English translation of KR20150050401A obtained from https://patents.google.com/patent on Dec. 13, 2022, 42 pages.

* cited by examiner

*Primary Examiner* — Michael B Nelson
(74) *Attorney, Agent, or Firm* — Warner Norcross + Judd LLP

(57) ABSTRACT

There is provided curable silicone elastomer compositions having enhanced adhesive properties with respect to a wide variety of substrates. The curable silicone elastomer compositions described herein are provided with a phenylmethylpolysiloxane based additive which comprises at least one, alternatively at least two Si—H groups per molecule and at least one, alternatively at least two anhydride functional groups per molecule. Said phenylmethylpolysiloxane based additives provide resulting elastomers with improved heat-humidity stabilization.

13 Claims, No Drawings

SILICONE ELASTOMER COMPOSITIONS

CROSS-REFERENCE TO RELATED APPLICATIONS

This application is the U.S. National Stage of International Application No. PCT/US2021/038651 filed on 23 Jun. 2021, which claims priority to and all advantages of U.S. Provisional Patent Application No. 63/043,371 filed on 24 Jun. 2020, the content of which is incorporated herein by reference.

The present disclosure relates to curable silicone elastomer compositions having enhanced adhesive properties with respect to a wide variety of substrates (hereafter referred to as "curable silicone elastomer compositions". The curable silicone elastomer compositions described herein are provided with an organopolysiloxane based additive, based additive which comprises at least one, alternatively at least two Si—H groups per molecule and at least one, alternatively at least two anhydride functional groups per molecule. Said organopolysiloxane based additive s provide resulting elastomers with heat-humidity stabilization with respect to substrates of other materials, i.e. elastomers made from said curable silicone elastomer compositions provide improved adhesion after aging. Elastomers made by curing the aforementioned compositions, composites comprising said elastomers and organic resins including polymer-based substrates and composites such as those formed from thermoplastic polymers and thermosetting resins", as well as processes for adhering said compositions to the organic resin-based substrates are also provided.

Curable silicone elastomer compositions cure to provide silicone elastomer materials (otherwise referred to as silicone rubbers). One suitable cure process is via an addition cure mechanism, otherwise described as a hydrosilylation process using a platinum group catalyst.

The curable silicone elastomer compositions may be curable silicone elastomer compositions able to adhere during cure to substrates made from thermoplastic materials, organic resin based materials or both thermoplastic materials and organic resin based materials with which they are placed in direct contact prior to or during the cure process. In some cases, said curable silicone elastomer compositions may be considered to be what is referred to in industry as having "selective adhesion" towards substrates. For the avoidance of doubt, the term selective adhesive herein is intended to mean that, upon cure, a composition is able to provide an adhesive bond directly on a thermoplastic or resin substrate without the need of e.g. primers or the like being applied on to the substrate surface, whilst being non-adhesive towards metallic substrates, such as molds. In such cases they are deemed to have selective adhesion. The term "direct contact" is intended to be understood to mean that the adhesive properties of the curable silicone elastomer compositions are such that no primers are required to be applied to the surface of the substrates made from thermoplastic materials, organic resin based materials or both thermoplastic materials and organic resin based materials in order to generate adhesion. By the time the silicone elastomer has cured on the substrate surface there is adhesion between the interfaces of the silicone elastomer and the organic substrate.

Silicone elastomers are used in a wide variety of applications including, for the sake of example, in electric and electronic, healthcare, kitchenware, and automotive applications not least because they have highly reliable properties with respect to heat resistance, weatherability and electrical insulation. In automotive connector seal applications, silicone elastomers can provide reliable sealing performance compared with many plastics particularly in harsh environments. They provide reliable seals for the use of safe running of automotive electronic control systems, enhancing the safety and comfort experience for both drivers and passengers. Silicone seals and coatings are also important for the waterproofing and sealing of parts made from silicone elastomer in smart phone and wearable devices. However, in certain applications their use has been limited due to their inability to form sufficiently strong adhesive bonds with plastic and thermoplastic substrates such as polycarbonates. Silicone elastomer compositions are also used in textile coatings such as those used in garments, automotive airbag coatings and parachutes, where adhesion to substrates is critical to enhance performance. Self-adherent silicone elastomers are also useful as adhesives, sealants and coatings for a variety of advanced assembly applications, such as lid seals for electronic modules, encapsulants, potting gels and coatings for consumer and automotive electronics, cure-in-place gaskets, headlamps, and appliances. Additionally, silicone elastomers with self-adhesion to thermoplastic filmic substrates are also useful as release liners and release coatings.

The application of primers onto the substrate surfaces was initially utilized to overcome this issue. However, several problems have arisen using methods requiring primers or high energy surface pre-treatments, such as irradiation by exposure to plasma, corona, flame, UV, or UV-ozone sources to activate the surface for adhesion.

Primer methods are cumbersome not least because they can result in unreliable productivity, quality control issues and indeed reliability issues for parts/articles being made. The selection, storage, use and processing of primers can also greatly influence the adhesion level resulting in a need to take great care of them not least during storage before use. So, the use of primers needs to be well controlled in order to achieve good adhesion and such processes are often time consuming and may result in low productivity and seals of variable quality. There is therefore a desire to avoid the use of primers if possible and this has latterly been achieved by using self-adhesive silicone elastomer materials which will have satisfactory adhesion without the need for primed surfaces.

While high energy treatments can eliminate the need for curing a wet chemical primer, they typically require special capital equipment and assembly processes to safely carry out the pre-treatments.

For example, it may be desired for a curable silicone elastomer composition to be overmolded, coated, printed, dispensed or otherwise applied onto other parts (or substrates) made of different or the same materials. In many cases, these substrates comprise organic polymer-based thermoplastics such as polyesters, polyamides, polyimides, acrylics, styrenics, polyphthalamides, polycarbonates. In other cases, the substrates comprise thermosetting resins such as epoxy or urethane or urea-based polymers or composites such as FR-4 substrates (FR-4 is a composite material of woven fiberglass cloth with an epoxy resin binder that is flame resistant). For example, a silicone gasket can be moulded onto a thermoplastic housing, made from a polyamide or polyester. In another example a wearable electronic device can be obtained by overmolding a hard thermoplastic such as polycarbonate with a soft layer or part made of liquid silicone rubber. Further examples include airbag fabrics such as polyamides or polyesters coated with a silicone elastomer. Organic substrates onto which self-adhesive silicone rubber compositions may be cured include, for the sake of example, polyesters such as polyethylene terephthalate (PET), polybutylene terephthalate (PBT), polyamides (PA) such as Nylon 6,6 (PA66) and Nylon 6,10, polycarbonates (PC) such as Bisphenol A polycarbonate, while enabling good release from metal mold during injection molding. In other embodiments, the curable silicone composition may be applied to an inorganic substrate such as metals, glass or ceramics, may be applied to an organic substrate such as thermoplastics and resins listed previously as well as to cellulosic substrates such as paper, wood, or any combination thereof as composites represented in a single substrate, or between multiple substrates in any combination to form a bonded article. In the case of bonding to polyamide or polyester fabrics, even self-adherent silicone compositions typically require that the fabric be plasma or corona treated to exhibit good adhesion and scrub-resistance.

In a further alternative proposal it has been suggested to incorporate hydrosilylation curable silicone elastomer cross-linkers, e.g. organohydrogenpolysiloxanes in the polycarbonate substrate. However, such a process has been found to have a negative effect on the physical properties of the polycarbonate itself preventing the resin from exerting its own properties. The physical engagement method leaves a possibility that the two segments may be disengaged by physical forces.

The use of silicone elastomers such as self-adhesive silicone elastomers is a preferred alternative as it can give better productivity, quality control and reliability of the parts/articles at least partially due to the removal of the need to use the primer or surface pre-treatments.

However, whilst these can provide good initial adhesion on various substrates, it has been found that the durability of the adhesive bond under prolonged exposure to heat and humidity represents a challenge, even with plasma-pre-treated substrates.

The durability of adhesion between the self-adhesive silicone material and the thermoplastic substrates, organic resin substrates or thermoplastic and organic resin substrates is of great importance for the use of the combination to be a success but the provision of composites with good adhesion to untreated thermoplastics and aged (heat/humidity) adhesion on various substrates, remains a technical challenge.

The present disclosure relates to a curable silicone elastomer composition that can achieve adhesion on plastic/thermoplastic/resin material substrates, comprising:
(A) one or more organosilicon compound containing at least 2 alkenyl and/or alkynyl groups per molecule and having a viscosity in a range of 1000 mPa·s to 500,000 mPa·s at 25° C.;
(B) a curing agent comprising
(B)(i) an organic peroxide radical initiator; or
(B)(ii) a hydrosilylation cure catalyst package comprising
   a. an organosilicon compound having at least 2, alternatively at least 3 Si—H groups per molecule; and
   b. hydrosilylation catalyst;
(C) at least one reinforcing and optionally one or more non-reinforcing fillers; and
(D) an organopolysiloxane based additive, which may be selected from a diphenylpolysiloxane based additive or a phenylalkylpolysiloxane based additive, alternatively a phenylalkylpolysiloxane based additive, alternatively a phenylmethylpolysiloxane based additive which comprises at least one, alternatively at least two Si—H groups per molecule and at least one, alternatively at least two anhydride functional groups per molecule.

Each of the one or more organopolysiloxanes (A) contain at least 2 alkenyl groups bonded to a silicon atom per molecule and has a viscosity of from 1000 mPa·s to 500,000 mPa·s at 25° C., alternatively 1000 mPa·s to 150,000 mPa·s at 25° C., alternatively 1000 mPa·s to 100,000 mPa·s at 25° C., alternatively 1000 mPa·s to 75,000 mPa·s at 25° C using a Brookfield© rotational viscometer using Spindle (LV1-LV-4) and adapting the speed (shear rate) according to the polymer viscosity and all viscosity measurements were taken at 25° C. unless otherwise indicated.

Examples of alkenyl groups include vinyl, allyl, butenyl, pentenyl, cyclohexenyl and hexenyl groups. These may be pendent or terminal or at both positions, that is, they may be present on any of the siloxy units of the organopolysiloxane (A). Component (A) comprises straight chain and/or branched organopolysiloxanes comprising multiple units of the formula (1)

$$R'_a SiO_{4-a/2} \quad (1)$$

wherein each R' may be the same or different and denotes a hydrocarbon group having from 1 to 18 carbon atoms, a substituted hydrocarbon group having from 1 to 18 carbon atoms or a hydrocarbonoxy group having up to 18 carbon atoms and has, on average, a value of from 1 to 3, preferably 1.8 to 2.2.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, trifluoropropyl and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Siloxy units may be described by a shorthand (abbreviated) nomenclature, namely—"M," "D," "T," and "Q", when R is usually an alkyl group unless otherwise indicated, e.g. a methyl group (further teaching on silicone nomenclature may be found in Walter Noll, Chemistry and Technology of Silicones, dated 1962, Chapter I, pages 1-9). The M unit corresponds to a siloxy unit where a=3, that is $R_3SiO_{1/2}$; the D unit corresponds to a siloxy unit where a=2, namely $R_2SiO_{2/2}$; the T unit corresponds to a siloxy unit where a=1, namely $R_1SiO_{3/2}$; the Q unit corresponds to a siloxy unit where a=0, namely $SiO_{4/2}$.

Examples of ingredient (component) (A) are polydiorganosiloxanes containing alkenyl or alkynyl groups but typically alkenyl groups at the two terminals and are represented by the general formula (I):

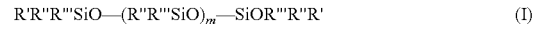

$$R'R''R'''SiO—(R''R'''SiO)_m—SiOR'''R''R' \quad (I)$$

In formula (I), each R' is an alkenyl or alkynyl group but typically an alkenyl group, which typically contains from 2 to 10 carbon atoms, such as vinyl, allyl, and 5-hexenyl.

R" does not contain ethylenic unsaturation. Each R" may be the same or different and is individually selected from monovalent saturated hydrocarbon radical, which typically contain from 1 to 10 carbon atoms, and monovalent aromatic hydrocarbon radical, which typically contain from 6 to 12 carbon atoms. R" may be unsubstituted or substituted with one or more groups that do not interfere with curing of this inventive composition, such as halogen atoms. R" 'is R' or R" and m represents a degree of polymerization suitable for ingredient (component) (A) to have a viscosity within the range discussed below.

Typically, all R" and R'" groups contained in a compound in accordance with formula (I) are methyl groups. Alternatively, at least one R" and/or R'" group in a compound in accordance with formula (I) is methyl and the others are phenyl or 3,3,3-trifluoropropyl. This preference is based on the availability of the reactants typically used to prepare the polydiorganosiloxanes (ingredient (component) (A)) and the desired properties for the cured elastomer prepared from compositions comprising such polydiorganosiloxanes.

Particularly preferred examples of groups R' include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Preferably, at least some and more preferably substantially all of the groups R are methyl. Some R' groups may be phenyl groups or fluoro groups. In one alternative, the polydiorganosiloxanes are largely polydialkylsiloxanes and/or polydialkylalkylphenylsiloxanes having at least two alkenyl groups per molecule. In a further alternative the polydiorganosiloxanes are largely polydimethylsiloxanes having at least two alkenyl groups per molecule. They are preferably substantially linear materials, which are end-blocked with a siloxane group of the formula $R''_3SiO_{1/2}$, wherein each R" is the same or different. It is understood that the cure rate and physical properties of curable composition are impacted by the structure and degree of functionality of component (A). For example, it may be advantageous in some embodiments to utilize branched, resinous or cyclic containing organopolysiloxanes with pendant alkenyl or alkynyl groups as part or all of component (A).

The viscosity of organopolysiloxane (A) at 25° C. is typically using a Brookfield© rotational viscometer using Spindle (LV-4) and adapting the speed according to the polymer viscosity and all viscosity measurements were taken at 25° C. unless otherwise indicated.

Examples of the organopolysiloxane (A) which may be used include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and mixtures thereof.

The organopolysiloxane (A) may be either a single polymer, or a combination of two or more different polymers.

The organopolysiloxane (A) is present in the composition at a level of from 10 to 85% by weight based on the total weight of the composition, alternatively 20 to 80% by weight based on the total weight of the composition, alternatively 20 to 75% by weight based on the total weight of the composition, alternatively from 30 to 65% by weight based on the total weight of the composition.

B) Curing Agent

The composition as described herein may be cured with an organic peroxide radical initiator (B)(i) or mixtures of different types of peroxide catalysts.

The peroxide radical initiator (B)(i) may be any of the well-known commercial peroxides used to cure silicone and/or fluorosilicone elastomer compositions. The amount of organic peroxide used is determined by the nature of the curing process, the organic peroxide used, and the composition used. Typically, the amount of peroxide radical initiator (B)(i) utilised in a composition as described herein is from 0.2 to 3% wt., alternatively 0.2 to 2% wt. in each case based on the weight of the composition.

Suitable organic peroxides are substituted or unsubstituted dialkyl-, alkylaroyl-, diaroyl-peroxides, e.g. benzoyl peroxide and 2,4-dichlorobenzoyl peroxide, ditertiarybutyl peroxide, dicumyl peroxide, lauroyl peroxide, t-butyl cumyl peroxide, bis(t-butylperoxyisopropyl) benzene, cyclohexanone peroxide, cumene hydroperoxide, tert-butyl hydroperoxide bis(t-butylperoxy)-2,5-dimethyl hexyne, 2,4-dimethyl-2,5-di(t-butylperoxy) hexane, di-t-butyl peroxide, and 2,5-bis(tert-butyl peroxy)-2,5-dimethylhexane.

Alternatively the composition may be cured using a hydrosilylation catalyst package (B)(ii) in the form of
(B)(ii)(a) an organosilicon compound having at least 2, alternatively at least 3 Si—H groups per molecule; and
(B)(ii)(b). hydrosilylation catalyst.

Component (B)(ii)(a) is a cross-linker in the form of an organosilicon compound containing at least 2 or 3 silicon-bonded hydrogen atoms per molecule. Component (B)(ii)(a) normally contains 3 or more silicon-bonded hydrogen atoms so that the hydrogen atoms can react with the unsaturated alkenyl or alkynyl groups of polymer (A) to form a network structure therewith and thereby cure the composition. Some or all of Component (B)(ii)(a) may alternatively have 2 silicon bonded hydrogen atoms per molecule when polymer (A) has greater than (>) 2 alkenyl or alkynyl groups per molecule.

The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of suitable organosilanes can include diphenylsilane, 2-chloroethylsilane, bis[(p-dimethylsilyl)phenyl] ether, 1,4-dimethyldisilylethane, 1,3,5-tris(dimethylsilyl) benzene, 1,3,5-trimethyl-1,3,5-trisilane, poly (methylsilylene)phenylene, and poly(methylsilylene) methylene. In some examples, the organohydrogensilane can have the formula $HR^1_2Si-R^2-SiR^1_2H$, wherein $R^1$ is $C_1$ to $C_{10}$ hydrocarbyl or $C_1$ to $C_{10}$ halogen-substituted hydrocarbyl, both free of aliphatic unsaturation, and $R^2$ is a hydrocarbylene group free of aliphatic unsaturation having a formula selected from 1,4- or 1,3-disubstituted phenyl, 4,4'- or 3,3'-disubstituted-1,1'-biphenyl, or para- or meta-disubstituted $Ph(C_gH_{2g})Ph$.

The molecular configuration of the organopolysiloxane containing at least 2 or 3 silicon-bonded hydrogen atoms per molecule (B)(ii)(a) is not specifically restricted, and it can be a straight chain, a straight chain with some branching, cyclic or silicone resin based. While the molecular weight of this component is not specifically restricted, the viscosity is typically from 0.001 to 50 Pa·s at 25° C. relying on the cup/spindle method of ASTM D 1084 Method B, using the most appropriate spindle from the Brookfield® RV or LV range for the viscosity range, in order to obtain a good miscibility with polymer (A).

Silicon-bonded organic groups used in component (B)(ii)(a) maybe exemplified by methyl, ethyl, propyl, butenyl, pentenyl, hexyl, or similar alkyl groups; phenyl, tolyl, xylyl, or similar aryl groups; 3-chloropropyl, 3,3,3-trifluoropropyl, or similar halogenated alkyl group, preferable of which are methyl and phenyl groups.

The organopolysiloxane containing at least 2 or 3 silicon-bonded hydrogen atoms per molecule (B)(ii)(a) is typically added in an amount such that the molar ratio of the total number of the silicon-bonded hydrogen atoms in component (B)(ii)(a) to the total number of alkenyl and/or alkynyl groups in polymer (A) is from 0.5:1 to 20:1. When this ratio is less than 0.5:1, a well-cured composition will not be obtained. When the ratio exceeds 20:1, there is a tendency for the hardness of the cured composition to increase when heated.

Examples of the organopolysiloxane containing at least 2 or 3 silicon-bonded hydrogen atoms per molecule (B)(ii)(a) include but are not limited to:
- (a') trimethylsiloxy-terminated methylhydrogenpolysiloxane,
- (b') trimethylsiloxy-terminated polydimethylsiloxane-methylhydrogensiloxane,
- (c') dimethylhydrogensiloxy-terminated dimethylsiloxane-methylhydrogensiloxane copolymers,
- (d') dimethylsiloxane-methylhydrogensiloxane cyclic copolymers,
- (e') copolymers and/or silicon resins consisting of $(CH_3)_2HSiO_{1/2}$ units, $(CH_3)_3SiO_{1/2}$ units and $SiO_{4/2}$ units,
- (f') copolymers and/or silicone resins consisting of $(CH_3)_2HSiO_{1/2}$ units and $SiO_{4/2}$ units,
- (g') copolymers and/or silicone resins consisting of $(CH_3)_2HSiO_{1/2}$ units, $SiO_{4/2}$ units and $(C_6H_5)_3SiO_{1/2}$ units, and alternatives in which methyl is replaced by phenyl groups or other alkyl groups.

Alternatively, component (B)(ii)(a) the cross-linker, may be a filler, e.g., silica treated with one of the above.

Component (B)(ii)(a) can be exemplified by the following compounds: a methylhydrogenpolysiloxane capped at both molecular terminals with trimethylsiloxy groups; a copolymer of a methylhydrogensiloxane and a dimethylsiloxane capped at both molecular terminals with trimethylsiloxy groups; dimethylsiloxane capped at both molecular terminals with dimethylhydrogensiloxy groups; a copolymer of a methylhydrogensiloxane and a dimethylsiloxane capped at both molecular terminals with dimethylhydrogensiloxy groups; a copolymer of a methylhydrogensiloxane and a methylphenylsiloxane capped at both molecular terminals with dimethylphenylsiloxy groups; a cyclic methylhydrogenpolysiloxane; a copolymer consisting of $(CH_3)_2HSiO_{1/2}$ siloxane units and $SiO_{4/2}$ units; a copolymer consisting of $(CH_3)_2HSiO_{1/2}$ siloxane units, $(CH_3)_3SiO_{1/2}$ siloxane units, and $SiO_{4/2}$ units, the aforementioned organopolysiloxanes in which a part or all methyl groups are substituted with ethyl, propyl, or similar alkyl groups; phenyl, tolyl, or similar aryl groups; 3,3,3-trifluoropropyl, or similar halogenated alkyl groups; or a mixture of two or more of the aforementioned organopolysiloxanes.

The organosilicon compound cross-linker (B)(ii)(a) is generally present in the curable silicone elastomer composition in an amount such that the ratio of the mole number of silicon-bonded hydrogen atoms of component (B)(ii)(a) to the mole number of alkenyl groups of component (A) ranges from (0.7:1.0) to (5.0:1.0), preferably from (0.9:1.0) to (2.5:1.0), and most preferably from (0.9:1.0) to (2.0:1.0).

The silicon-bonded hydrogen (Si—H) content of component (B)(ii)(a) is determined using quantitative infra-red analysis in accordance with ASTM E168. In the present instance the silicon-bonded hydrogen to alkenyl (vinyl) and/or alkynyl ratio is important when relying on a hydrosilylation cure process. Generally, this is determined by calculating the total weight % of alkenyl groups in the composition, e.g., vinyl [V] and the total weight % of silicon bonded hydrogen [H] in the composition and given that the molecular weight of hydrogen is 1 and of vinyl is 27 the molar ratio of silicon bonded hydrogen to vinyl is 27[H]/[V].

Typically dependent on the number of unsaturated groups in component (A) and the number of Si—H groups in component (B)(ii)(a), component (B)(ii)(a) will be present in an amount of from 0.1 to 40% by weight of the total composition, alternatively from 0.5 to 20%, by weight of the total composition alternatively 0.5 to 10% by weight of the total composition, further alternatively from 1% to 5% by weight of the total composition.

Component (B)(ii)(b) is at least one hydrosilylation (addition) reaction catalyst. These are usually selected from catalysts of the platinum metal group (platinum, ruthenium, osmium, rhodium, iridium and palladium), or a compound of one or more of such metals. Platinum and rhodium compounds are preferred due to the high activity level of these catalysts in hydrosilylation reactions. Component (B)(ii)(b) catalyses the reaction between the alkenyl e.g. vinyl groups of component (A) and the Si—H groups of component (B)(ii)(a) resulting in a cross-linked network when the curable silicone elastomer compositions are cured to their respective elastomers.

The catalyst (B)(ii)(b) can be a platinum group metal, a platinum group metal deposited on a carrier, such as activated carbon, metal oxides, such as aluminium oxide or silicon dioxide, silica gel or powdered charcoal, or a compound or complex of a platinum group metal.

Examples of preferred hydrosilylation catalysts (B)(ii)(b) are platinum based catalysts, for example, platinum black, platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. Soluble platinum compounds that can be used include, for example, the platinum-olefin complexes of the formulae $(PtCl_2 \cdot (olefin))_2$ and $H(PtCl_3 \cdot olefin)$, preference being given in this context to the use of alkenes having 2 to 8 carbon atoms, such as ethylene, propylene, isomers of butene and of octene, or cycloalkanes having 5 to 7 carbon atoms, such as cyclopentene, cyclohexene, and cycloheptene. Other soluble platinum catalysts are, for the sake of example a platinum-cyclopropane complex of the formula $(PtCl_2C_3H_6)_2$, the reaction products of hexachloroplatinic acid with alcohols, ethers, and aldehydes or mixtures thereof, or the reaction product of hexachloroplatinic acid with methylvinylcyclotetrasiloxane in the presence of sodium bicarbonate in ethanolic solution. Platinum catalysts with phosphorus, sulfur, and amine ligands can be used as well, e.g., $(Ph_3P)_2PtCl_2$; and complexes of platinum with vinylsiloxanes, such as sym-divinyltetramethyldisiloxane.

Hence, specific examples of suitable platinum-based catalysts include
- (i) complexes of chloroplatinic acid with organosiloxanes containing ethylenically unsaturated hydrocarbon groups are described in U.S. Pat. No. 3,419,593;
- (ii) chloroplatinic acid, either in hexahydrate form or anhydrous form;
- (iii) a platinum-containing catalyst which is obtained by a method comprising reacting chloroplatinic acid with an aliphatically unsaturated organosilicon compound, such as divinyltetramethyldisiloxane;
- (iv) alkene-platinum-silyl complexes as described in U.S. Pat. No. 6,605,734 such as $(COD)Pt(SiMeCl_2)_2$ where "COD" is 1,5-cyclooctadiene; and/or
- (v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (B)(ii)(b) of the hydrosilylation curable silicone elastomer composition is present in the total composition in a catalytic amount, i.e., an amount or quantity sufficient to catalyse the addition/hydrosilylation reaction and cure the composition to an elastomeric material under the desired conditions. Varying levels of the hydrosilylation catalyst (B)(ii)(b) can be used to tailor reaction rate and cure kinetics. The catalytic amount of the hydrosilylation catalyst (B)(ii)(b) is generally between 0.01 ppm, and 10,000 parts by weight of platinum-group metal, per million parts (ppm), based on the weight of the composition polymer (A) and filler (C); alternatively, between 0.01 and 5000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0 wt. % of the composition.

Component (C) is one or more finely divided, reinforcing fillers optionally in combination with one or more and/or non-reinforcing fillers.

The reinforcing fillers of component (C) may be exemplified by finely divided fumed silica and/or a finely divided precipitated silica, colloidal silicas and/or suitable silicone resins.

Precipitated silica fumed silica and/or colloidal silicas are particularly preferred because of their relatively high surface area, which is typically at least 50 m$^2$/g (BET method in accordance with ISO 9277: 2010). Fillers having surface areas of from 50 to 450 m$^2$/g (BET method in accordance with ISO 9277: 2010), alternatively of from 50 to 300 m$^2$/g (BET method in accordance with ISO 9277: 2010), are typically used. All these types of silica are commercially available.

When reinforcing filler (C) is naturally hydrophilic (e.g., untreated silica fillers), it is typically treated with a treating agent to render it hydrophobic. These surface modified reinforcing fillers (C) do not clump and can be homogeneously incorporated into polydiorganosiloxane polymer (A), described below, as the surface treatment makes the fillers easily wetted by polydiorganosiloxane polymer (A).

Typically reinforcing filler (C) may be surface treated with any low molecular weight organosilicon compounds disclosed in the art applicable to prevent creping of organosiloxane compositions during processing. For example, organosilanes, polydiorganosiloxanes, or organosilazanes e.g., hexaalkyl disilazane, short chain siloxane diols to render the filler(s) hydrophobic and therefore easier to handle and obtain a homogeneous mixture with the other ingredients (components). Specific examples include, but are not restricted to, silanol terminated trifluoropropylmethyl siloxane, silanol terminated vinyl methyl (ViMe) siloxane, silanol terminated MePh siloxane, liquid hydroxyldimethyl-terminated polydiorganosiloxane containing an average from 2 to 20 repeating units of diorganosiloxane in each molecule, hydroxyldimethyl terminated Phenylmethyl Siloxane, hexaorganodisiloxanes, such as hexamethyldisiloxane, divinyltetramethyldisiloxane; hexaorganodisilazanes, such as hexamethyldisilazane (HMDZ), divinyltetramethyldisilazane and tetramethyldi(trifluoropropyl)disilazane; hydroxyldimethyl terminated polydimethylmethylvinyl siloxane, octamethyl cyclotetrasiloxane, and silanes including but not limited to methyltrimethoxysilane, dimethyldimethoxysilane, vinyltrimethoxysilane, methyltriethoxysilane, vinyltriethoxysilane, chlrotrimethyl silane, dichlrodimethyl silane, trichloromethyl silane. A small amount of water can be added together with the silica treating agent(s) as processing aid.

The surface treatment may be undertaken prior to introduction in the composition or in situ (i.e., in the presence of at least a portion of the other ingredients (components) of the composition herein by blending these ingredients (components) together at room temperature or above until the filler is completely treated. Typically, untreated reinforcing filler (C) is treated in situ with a treating agent in the presence of polydiorganosiloxane polymer (A) which results in the preparation of a silicone elastomer base material which can subsequently be mixed with other ingredients (components).

Reinforcing filler (C) is present in an amount of from 5.0 to 40 wt. % of the solids content of the composition, alternatively of from 7.5 to 35 wt. % of the solids content of the composition, alternatively of from 10.0 to 35 wt. % based on the weight % of the solids content of the composition. Hence, the amount of reinforcing filler (C) e.g., finely divided silica and/or silicone resins herein may therefore be for example, from 2.0 to 20 wt. % of the total composition, alternatively of from 2.5 to 15 wt. % of the total composition. In some instances, the amount of reinforcing filler may be of from 5.0 to 15 wt. % based on the weight of the total composition.

Non-reinforcing fillers may optionally be included in component (C) herein. These may include, for the sake of example, crushed quartz, calcium carbonate, diatomaceous earths, barium sulphate, iron oxide, titanium dioxide and carbon black, talc, wollastonite, aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Other non-reinforcing fillers may include, aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3 \cdot 2SiO_2$; kyanite; and $Al_2SiO_5$. Ring silicates may be utilised as non-reinforcing fillers, these include silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$. Sheet silicates may alternatively or additionally be used as non-reinforcing fillers where appropriate group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite. In one alternative the fillers will be selected from one or more of fumed silica, precipitated silica, calcium carbonate, talc, mica, quartz and, aluminium oxide.

As previously indicated component (D) as hereinbefore described is an organopolysiloxane based additive. The organopolysiloxane based additive may be selected from a diphenylpolysiloxane based additive or a phenylalkylpolysiloxane based additive, alternatively a phenylalkylpolysiloxane based additive, alternatively a phenylmethylpolysiloxane based additive which comprises at least one, alternatively at least two Si—H groups per molecule and at least one alternatively at least two anhydride functional groups per molecule.

In one embodiment the organopolysiloxane based additive which may be selected from a diphenylpolysiloxane based additive or a phenylalkylpolysiloxane based additive, alternatively phenylalkylpolysiloxane based additive, alternatively phenylmethylpolysiloxane based additive (D) may be of the following formula

D-O—[Y]-D in which each D group is a cyclic siloxane of the structure
 [(O—Si(—)R$^3$)(OSiR$^3$H)$_m$(OSiR$^3$X)$_a$]
wherein each R$^3$ group is an alkyl group containing from 1 to 6 carbons and each X is a group containing anhydride functionality in which m is an integer of at least 1 or alternatively at least 2, alternatively from 1 to 20, alternatively from 1 to 10, alternatively from 1 to 6 and a is an integer of at least 1, alternatively from 1 to 20, alternatively from 1 to 10, alternatively from 1 to 6; preferably m+a is from 2 to 20, alternatively from 2 to 10, alternatively from 2 to 6; and
[Y] is a linear siloxane group of the structure [SiPhR$^3$O]$_n$ or [SiPh$_2$O]$_n$, alternatively [SiPhR$^3$O]$_n$;
Wherein Ph is a phenyl group and n is an integer of from 2 to 20, alternatively 4 to 10, alternatively 5 to 10.

In the latter the Si in the [(O—Si(—)R$^3$] group in the cyclic siloxane group D is bonded to the linear siloxane group via an oxygen. Each R$^3$ group may be the same of different and is an alkyl group or substituted alkyl group containing from 1 to 6 carbons, alternatively each R$^3$ group may be the same of different and is an alkyl group or substituted alkyl group selected from a methyl, ethyl, propyl group, trifluoropropyl or nonafluorohexyl, alternatively a methyl or ethyl group.

By the term anhydride functionality it is meant that each X comprises the following structure: —C(=O)—O—C(=O)—. The anhydride functionality may be derived from e.g. reacting an unsaturated anhydride with an Si—H group of the cyclic siloxane described above. Unsaturated anhydrides include maleic anhydride, alkenyl succinic anhydrides, polyisobutylenylsuccinic anhydride, citraconic anhydride, bromomaleic anhydride, crotonic anhydride, diphenic anhydride, isatoic anhydride, itaconic anhydride, phenylmaleic anhydride, nadic anhydride, 3-(but-3-enyl)-1,2,3,6-tetrahydrophthalic anhydride, and cis-1,2,3,6-tetrahydrophthalic anhydride and phenylsuccinic anhydride. The anhydride functionality may also be exemplified by unsaturated anhydrides featuring bridged heterocyclic structures, such as bicyclooctenedicarboxylic anhydrides such as CAS 6708-37-8, carbic anhydrides (CAS 129-64-6), bicyclooctenetetracarboxylic dianhydrides such as bicyclo[2,2,2]oct-7-ene-2,3,5,6-tetracarboxylic dianhydride (CAS 1719-83-1), ethenocyclobutabenzofuran-triones such as CAS 55054-47-2, and ethenocycloheptafuran-diones such as CAS 5650-01-1 and their isomeric variants.

For example, the anhydride functionality can be, and desirably is, a cyclic anhydride i.e. in a five-membered or six membered ring, where the single bonded oxygen and carbonyl carbon are part of a ring of bonded atoms such as in maleic anhydride. One desirably polyorganosiloxane of the present invention comprises a maleic anhydride remnant—that is, the components of a maleic anhydride molecule that remain after reacting the carbon-carbon double bond.

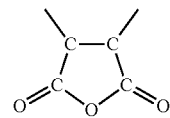

An example being where X is the anhydride functionality depicted above linked to a silicon of an (OSiR$^3$X) unit in the cyclic siloxane via an alkylene group, which can be achieved by reacting an alkenylsuccinic anhydride, such as allyl succinic anhydride with an Si—H group intermediate to the cyclic siloxane described above. Each cyclic siloxane D may have the same or a different number of members in the ring, for example from 6 to 20 members in the ring, alternatively from 6 to 16 members in the ring, alternatively from 6 to 14 members in the ring, alternatively from 8 to 12 members in the ring, e.g. the following formula [2] where

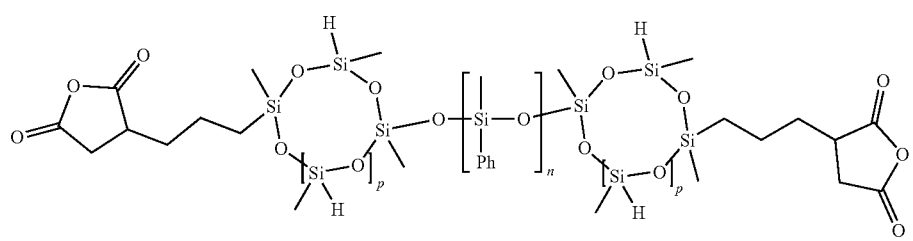

[2]

where each p in the above may independently be 1, 2 or 3 or more, alternatively is 1, 2 or 3 and indeed component (D) may comprise a mixture of one or other of the above in which each p per molecule is 1, 2 or 3 or more. When a mixture is present it is preferred that most molecules preferably are where p is 1. When component/additive (D) is a mixture, the mixture may additionally comprise, for the sake of example, analogous structures to the above but where cyclic siloxane D is a ten membered ring e.g. where p is 2 or a twelve membered ring where p is 3 or the like. In one embodiment the mixture may comprise approximately 50 to 80% of molecules where p is 1, 20 to 49% of molecules where p is 2, and the remainder (if any) being molecules where p is 3 or more.

Hence, for the sake of example, where m=2 and a=1, additive (D) may have the following structure, where cyclic siloxane D is an eight membered ring e.g. where p is 1 although it should be appreciated that the anhydride group may attach to the cyclic moiety at the position of any Si—H group and hence the following is merely for reference.

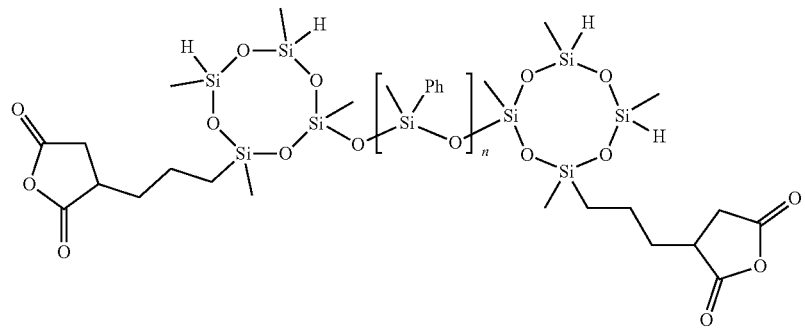

When component/additive (D) is a mixture, comprising the above the mixture may additionally comprise, for the sake of example, analogous structures to the above such as where cyclic siloxane D is a ten membered ring e.g. where p is 2 (in formula [2]) and/or a twelve membered ring where p is 3 (in formula [2]) or the like).

The organopolysiloxane based additive (D), which may be selected from a diphenylpolysiloxane based additive or a phenylalkylpolysiloxane based additive, alternatively phenylalkylpolysiloxane based additive (D), alternatively phenylmethylpolysiloxane based additive (D) which comprises at least one, alternatively at least two Si—H groups per molecule and at least two anhydride functional groups per molecule as described above may be prepared following the process described in PCT/US19/064350 in the name of the current applicant.

The amount of organopolysiloxane based additive, alternatively phenylalkylpolysiloxane based additive, alternatively a phenylmethylpolysiloxane based additive (D) is typically is from 0.01 to 25 weight percent based on the total weight of the composition, or from 0.05 to 5 and most typically from 0.25 to 4 weight percent based on the total weight of the composition. In some cases where component (D) bears more than 2 SiH groups per molecule, component (D) may also serve to fulfill partially the role of the SiH component of Component (B). In such cases, one skilled in the art would appreciate that larger percentages of component (D) may be utilized.

Optional additives may be present in the composition depending on the intended use of the curable silicone elastomer composition. Examples include one or more cure inhibitors, vinylated silicone gum, a dimethylvinyl polydiorganosiloxane having a viscosity of from 10 to 750 mPa·s at 25° C., mold releasing agents, adhesion catalysts, peroxides and/or pigments. Other additives might include electrically conductive fillers, thermally conductive fillers, pot life extenders, flame retardants, lubricants, mold release agents, UV light stabilizers, bactericides, wetting agents, heat stabilizers, chain extenders, compression set additives and plasticizers or the like.

Cure inhibitors are used, when required, to prevent or delay the addition-reaction curing process especially during storage. The optional Addition-reaction inhibitors of platinum based catalysts are well known in the artand include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines. Alkenyl-substituted siloxanes as described in U.S. Pat. No. 3,989,667 may be used, of which cyclic methylvinylsiloxanes are preferred.

One class of known hydrosilylation reaction inhibitor includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-butyn-2-ol, propargyl alcohol, 1-phenyl-2-propyn-1-ol, 3,5-dimethyl-1-hexyn-3-ol, 1-ethynylcyclopentanol, 3-methyl-1-penten-4-yn-3-ol, and mixtures thereof. Derivatives of acetylenic alcohol may include those compounds having at least one silicon atom.

When present, inhibitor concentrations as low as 1 mole of inhibitor per mole of the metal of catalyst will in some instances impart satisfactory storage stability and cure rate. In other instances, inhibitor concentrations of up to 500 moles of inhibitor per mole of the metal of catalyst are required. The optimum concentration for a given inhibitor in a given composition is readily determined by routine experimentation. Dependent on the concentration and form in which the inhibitor selected is provided/available commercially, when present in the composition, the inhibitor is typically present in an amount of from 0.0125 to 10% by weight of the composition.

If deemed necessary the composition may additionally contain a vinylated silicone gum. Such gums typically have an analogous structure to component A, with dimethylvinyl terminal groups a polydimethylsiloxane polymer chain but potentially some vinyl methyl group combination along the length of the polymer chain may be present. In the case of these polymers the main difference is the chain length and consequent viscosity as opposed to component (A) typically gums of this type have a viscosity of at least 1,000,000 mPa·s at 25° C., often significantly more. However, because of the difficulty in measuring viscosity above these values, gums tend to be described by way of their Williams plasticity values in accordance with ASTM D-926-08 as opposed to by viscosity. Gums of the type described herein typically have a William's plasticity of from 30 mm/100, alternatively at least 50 mm/100 alternatively at least 100 mm/100, alternatively in a range of from 100 mm/100 to 350 mm/100 in accordance with ASTM D-926-08.

A dimethylvinyl polydiorganosiloxane having a viscosity of from 10 to 750 mPa·s at 25° C. Such dimethylvinyl polydiorganosiloxane typically have an analogous structure to component (A), with dimethylvinyl terminal groups a polydimethylsiloxane polymer chain but potentially some vinyl methyl group combination along the length of the polymer chain may be present. In the case of these polymers the main difference is the chain length and consequent viscosity as opposed to component (A) polymers of this type have a zero-shear viscosity of from 10 to 750 mPa·s at 25° C. The zero-shear viscosity is obtained by extrapolating to zero the value taken at low shear rates where the viscosity-shear rate curve is rate-independent, which is a test-method independent value. The zero-shear viscosity of a substance at 25° C. is typically obtained using a rheometer or a viscometer such as a Brookfield® rotational viscometer using Spindle (LV-1-LV-4) and adapting the speed (shear rate) according to the polymer viscosity.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, magnesium oxide, and aluminium oxide), graphite, diamond, and mixtures or derivatives thereof.

Examples of chain extender include straight chain organopolysiloxanes containing 2 silicon-bonded hydrogen groups on the terminal position. Such chain extender is different from component (B)(ii)(a) the cross-linker in the form of an organosilicon compound containing at least 2 or 3 silicon-bonded hydrogen atoms per molecule. Typically, the chain extender will have two Si—H groups and the cross-linker will have at least three Si—H groups. Examples of chain extenders include but are not limited to disiloxane or a low molecular weight polyorganosiloxane containing two silicon-bonded hydrogen atoms at the terminal positions. The chain extender typically reacts with the alkenyl radicals of polymers (A) thereby linking two or more molecules of polymers (A) together and increasing its effective molecular weight and the distance between potential cross-linking sites.

A disiloxane is typically represented by the general formula $(HR^a2Si)_{2O}$. When the chain extender is a polyorganosiloxane, it has terminal units of the general formula $HR^{a2}SiOU_2$ and non-terminal units of the formula $R^{b2}SiO$. In these formulae, Ra and $R^b$ individually represent unsubstituted or substituted monovalent hydrocarbon radicals that are free of ethylenic unsaturation and fluoro content, which include, but are not limited to alkyl groups containing from 1 to 10 carbon atoms, substituted alkyl groups containing from 1 to 10 carbon atoms such as chloromethyl, cycloalkyl groups containing from 3 to 10 carbon atoms, aryl containing 6 to 10 carbon atoms, alkaryl groups containing 7 to 10 carbon atoms, such as tolyl and xylyl, and aralkyl groups containing 7 to 10 carbon atoms, such as benzyl.

Further examples of chain extenders include tetramethyldihydrogendisiloxane or dimethylhydrogen-terminated polydimethylsiloxane.

A chain extender may be added in an amount from 1 to 10 parts by weight, based on the weight of polymers (A), typically 1 to 10 parts per 100 parts of the combination of polymers (A).

Optionally an adhesion promoter may be present in the composition. Any suitable adhesion promoter(s) may be utilised. These may comprise or consist of one or more alkoxysilanes containing methacrylic groups or acrylic groups and/or one or more alkoxysilanes containing epoxy groups and optionally one or more condensation catalyst which, when present, is used to activate and/or accelerate the reaction of the adhesion promoter.

Examples of alkoxysilanes containing methacrylic groups or acrylic groups such as methacryloxymethyl-trimethoxysilane, 3-methacryloxypropyl-tirmethoxysilane, 3-methacryloxypropyl-methyldimethoxysilane, 3-methacryloxypropyl-dimethylmethoxysilane, 3-methacryloxypropyl-triethoxysilane, 3-methacryloxypropyl-methyldiethoxysilane, 3-methacryloxyisobutyl-trimethoxysilane, or a similar methacryloxy-substituted alkoxysilane; 3-acryloxypropyl-trimethoxysilane, 3-acryloxypropyl-methyldimethoxysilane, 3-acryloxypropyl-dimethyl-methoxysilane, 3-acryloxypropyl-triethoxysilane, or a similar acryloxy-substituted alkyl-containing alkoxysilane.

Examples of epoxy-containing alkoxysilanes which may be used as adhesion promoter may include 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane.

Adhesion catalysts, i.e. condensation catalysts used to activate and/or accelerate the reaction of the adhesion promoter described above may also be utilised. Such condensation catalysts may be selected from organometallic catalysts comprising titanates, e.g. Tetrapropoxy titanate; zirconates, organo aluminium chelates, titanium chelates and/or zirconium chelates.

For example, titanate and Zirconate based catalysts may comprise a compound according to the general formula $Ti[OR^5]_4$ or $Zr[OR^5]_4$ where each $R^5$ may be the same or different and represents a monovalent, primary, secondary or tertiary aliphatic hydrocarbon group which may be linear or branched containing from 1 to 20 carbon atoms, alternatively 1 to 10 carbon atoms. Optionally the titanate or zirconate may contain partially unsaturated groups. Preferred examples of $R^5$ include but are not restricted to methyl, ethyl, propyl, isopropyl, butyl, tertiary butyl and a branched secondary alkyl group such as 2,4-dimethyl-3-pentyl. Preferably, when each $R^5$ is the same, $R^5$ is an isopropyl, branched secondary alkyl group or a tertiary alkyl group, in particular, tertiary butyl. Specific examples include but are not restricted to zirconium tetrapropylate and zirconium tetrabutyrate, tetra-isopropyl zirconate, zirconium (IV) tetraacetyl acetonate, (sometimes referred to as zirconium AcAc), zirconium (IV) hexafluoracetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), zirconium tributoxyacetylacetate, zirconium butoxyacetylacetonate bisethylacetoacetate, zirconium butoxyacetylacetonate bisethylacetoacetate, diisopropoxy bis (2,2,6,6-tetramethyl-heptanethionate) zirconium, or similar zirconium complexes having β-diketones (including alkyl-substituted and fluoro-substituted forms thereof) which are used as ligands. Titanate equivalents of the above zirconates are also included.

Suitable aluminium-based condensation catalysts may include one or more of $Al(OC_3H_7)_3$, $Al(OC_3H_7)_2(CH_3COCH_2COC1_2H_{25})$, $Al(OC_3H_7)_2(COCH_3)$, aluminium acetylacetonate and $Al(OC_3H_7)_2(OCOC_{12}H_{25})$.

If deemed necessary and/or beneficial, the adhesion promoter may also include other ingredients such as other silane coupling agents, organic compounds containing two or more acrylate groups and/or reactive siloxanes.

Examples of adhesion promoters include silane coupling agents, such as methyltrimethoxysilane, vinyltrimethoxysilane, allyltrimethoxysilane, 1,6-bis(trimethylsilyl)hexane, 3-methacryloxypropyltrimethoxysilane and/or glycidoxypropyltrimethoxysilane.

Examples of organic compounds containing two or more acrylate groups include, e.g. diacrylates such as $C_{4-20}$ alkanediol diacrylate such as hexanediol diacrylate heptanediol diacrylate octanediol diacrylate nonanediol diacrylate and or undecanediol; and/or pentaerythritol tetraacrylate.

Examples of the reactive siloxanes include siloxanes such as hydroxy-terminated dimethyl-methylvinyl siloxane trimethylsiloxy-terminated methylhydrogen siloxane in each case optionally containing one or more perfluoroalkyl chains, such as trifluoropropyl or perfluorobutylethyl side chains. Typically, such siloxanes have a viscosity of from 0.001 to 0.1 Pa·s at 25° C., alternatively of from 0.001 to 0.05 Pa·s at 25° C.

When present, the adhesion promoter is typically present in the composition in an amount of from about 0.1 to 6 wt. % of the composition; alternatively, 0.1 to 4 wt. % of the composition.

Examples of flame retardants include aluminium trihydrate, magnesium hydroxide, magnesium silicates, chlorinated paraffins, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include iron oxides, carbon black, and mixtures or derivatives thereof.

Examples of lubricants include tetrafluoroethylene, resin powder, graphite, fluorinated graphite, talc, boron nitride, fluorine oil, silicone oil, molybdenum disulfide, and mixtures or derivatives thereof.

Further additives include silicone fluids, such as trimethylsilyl or OH terminated siloxanes. Such trimethylsiloxy or OH terminated polydimethylsiloxanes typically have a viscosity <150 mPa·s at 25° C. When present such silicone fluid may be present in the curable silicone elastomer composition in an amount ranging of from 0.1 to 5% weight, based on the total weight of the composition.

The curable silicone elastomer compositions may comprise:
a curable silicone elastomer composition that can achieve significant adhesion on a thermoplastic substrate, on an organic resin substrate or on a thermoplastic and organic resin substrate surface which comprises:
Component A
one or more organopolysiloxanes containing at least 2 alkenyl groups per molecule and having a viscosity in a range of 1000 mPa·s to 500,000 mPa·s at 25° C., in an amount of from 10 to 85% by weight based on the total weight of the composition, alternatively 20 to 80% by weight based on the total weight of the composition, alternatively 20 to 75% by weight based on the total weight of the composition, alternatively from 30 to 65% by weight based on the total weight of the composition;

Component B
When component (B) is (B)(i) the organo peroxide may be present in an amount of from 0.2 to 3% wt., alternatively 0.2 to 2% wt. in each case based on the weight of the composition. Alternatively, Component (B)(ii)(a) an organopolysiloxane containing at least 2 or 3 silicon-bonded hydrogen atoms per molecule, in an amount of 0.1-40% weight of the total composition, alternatively from 0.5 to 20%, by weight of the total composition alternatively 0.5 to 10% by weight of the total composition, further alternatively from 1% to 5% by weight of the total composition;
Component (B)(ii)(b), at least one hydrosilylation catalyst, is present in an amount of 0.01-10% by weight of the total composition, alternatively 0.01% to 5% by weight of the total composition, further alternatively from 0.05% to 2% by weight of the total composition;
Component (C), at least one reinforcing and optionally one or more non-reinforcing fillers in an amount of from 1 to 80% by weight, based on the total weight of the composition, alternatively from 1 to 50% by weight, based on the total weight of the composition, alternatively 5 to 50% by weight, based on the total weight of the composition, further alternatively from 8 to 30% by weight, based on the total weight of the composition;
This disclosure is intended to include any of the above combinations providing the total % composition of components (A) to (D) and any optional additives make up 100 wt. % by weight of the composition. The composition above excludes component (D), is 100% by weight.

When cured via hydrosilylation, it is important for the catalyst (B)(ii)(b) to be stored separately from cross-linker (B)(ii)(a) to prevent premature cure during storage. Typically, the catalyst (B)(ii)(b) is included in the part A composition and the cross-linker (B)(ii)(a) and any optional inhibitor are stored in part B composition. Similarly, given component (D) contains multiple Si—H groups when hydrosilylation curable component D should be stored separately from the catalyst (B)(ii)(b). Hence in the case of a hydrosilylation curable composition, typically, the cross-linker (B)(ii)(a), component D and any inhibitor used are all included in the part B composition.

The optional additives (excluding the inhibitor) may be in either part (A) or part (B) or in both parts. They may also be added into the final mixture after parts (A) or part (B) have been combined.

In one embodiment, there is provided a process for preparing an article or a composite part of an article comprising
a) forming a mixture of the curable silicone elastomer composition described herein, and
b) applying the mixture onto a surface of a substrate, optionally after the substrate has been surface treated by e.g., plasma, corona and/or UV-C;
c) curing the mixture at a temperature of from 80 to 250° C.

In step (a) when the composition is stored in multiple parts before use, the different parts are combined together and homogeneously mixed, with the optional subsequent step of the addition of any additional additive as may be required by the final use of the composition.

The substrate may be any suitable thermoplastic or organic resin substrates Examples of substrates include acrylonitrile-butadiene-styrene, polyphenylene/styrene blends, polystyrenes, polycarbonates (PC), polyurethane, styrene resin, polyethylene, polypropylene, acrylic, polyacrylates, polymethacrylates, polyacrylamides, polyesters, polyethylene terephthalate, polybutylene terephthalate (PBT), polyphenylene oxide, polyphenylene sulfide, polysulfone, nylon, polyamide (PA), blends of polyamide resins with syndiotactic polystyrene, polyimide, fluoropolymers, and liquid crystal resin, non-resin containing polyetherimides; phenolic resins, epoxy resins, urea resins, melamine resins, alkyd resins, acrylonitrile-butadiene-styrenes, styrene-modified poly(phenylene oxides), poly(phenylene sulfides), vinyl esters or polyphthalamides and combinations thereof. Other substrates may include for the sake of example, cellulosics, and fabrics/textiles e.g. on cotton or other natural and synthetic fiber garments. Any of the above may be activated if desired, e.g. plasma, corona or UV-C activated. Typically, when the composition is not of a self-adhesive type the composition herein may be adhered to metal substrates e.g. silicon, aluminium, stainless steel alloys, titanium, copper, nickel, silver, gold, and combinations thereof.

The homogeneous mixing of the components of the present curable silicone elastomer composition may be undertaken by using a suitable mixing means such as a kneader mixer, a Z-blade mixer, a two roll mill (open mill), a three roll mill, a Haake® Rheomix OS Lab mixer, a screw extruder or a twin-screw extruder or the like. Speed mixers as sold by e.g. Hauschild and as DC 150.1 FV, DAC 400 FVZ or DAC 600 FVZ, may alternatively be used.

The curable silicone elastomer compositions may be processed (or cured) by injection moulding, press moulding, extrusion moulding, transfer moulding, press vulcanization, calendaring.

Curing can for example take place in a mold to form a moulded silicone article adhered to an e.g. polycarbonate substrate. The curable silicone elastomer composition may for example be injection moulded to form an article adhered to the polycarbonate material, or the composition can be overmolded by injection moulding around thermoplastic substrates, organic resin substrates or thermoplastic and organic resin substrates or articles or over a thermoplastic substrate, organic resin substrate or thermoplastic and organic resin substrate. When cured in presence of a heat sensitive substrate, the curable silicone elastomer compositions as hereinbefore described is cured under such conditions enabling development of mechanical adhesion with the heat sensitive substrate and the like, and more specifically, by using a temperature and curing time at which the heat sensitive substrate is not deformed, melted, or denatured.

The curable silicone elastomer composition may be cured into silicone elastomer articles which are adhered to thermoplastic substrates, organic resin substrates or thermoplastic and organic resin substrates, for example, tubes, strips, solid cord or custom profiles according to the size specifications of the manufacturer.

The curable silicone elastomer composition as hereinbefore described may be applied to the surface of the substrate by any suitable means such as rolling, spreading, 3-D printing and the like, and cured as described above. After application of the curable silicone elastomer composition onto the substrate, the composition is cured at the cure temperature ranging between 80° C. and 250° C. Such temperatures are generally determined by the materials involved. In the case of 3-D printing the 3D printer may be selected from a fused filament fabrication printer, a selective laser sintering printer, a selective laser melting printer, a stereolithography printer, a powder bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer.

Key advantages regarding the curable silicone elastomer composition as hereinbefore described are:
Heat-humidity stabilization of adhesion (not only initial adhesion)
Broad application range (works on PBT, polycarbonate, polyamide)
Does not impact cure and physical properties In one embodiment herein there is provided an article consisting of a silicone elastomer cured from curable silicone elastomer composition as hereinbefore described or consisting of a silicone elastomer cured from curable silicone elastomer composition on a rigid or flexible substrate such as the type described above.

In another embodiment there is provided a composite part comprising a silicone elastomer cured from the curable silicone elastomer composition as hereinbefore described as described above on a rigid or flexible substrate. It is to be understood that such composite parts include those constructions where any of a substrate and a silicone elastomer are used as an integral component in an article. Examples of substrates as described above.

In one embodiment, there is provided an article or composite part comprising an elastomeric material generated from the curable silicone elastomer composition above adhered to a thermoplastic substrate, organic resin substrate or thermoplastic and organic resin substrate such as described above.

In another embodiment the curable silicone elastomer composition as hereinbefore described may be applied to the surface of the substrate be processed using a 3D printing method. A typical method of forming a three-dimensional (3D) article may comprise multiple steps. For example, the method may comprise (i) providing a thermoplastic substrate, organic resin substrate or thermoplastic and organic resin substrate. The method may further comprise (ii) heating the substrate. In addition, the method may comprise (iii) printing a curable silicone elastomer composition as hereinbefore described on the substrate with a 3D printer to form a subsequent layer. Optionally, the latter step may be repeated if required to apply one or more further layers.

Examples of such articles or composite parts, in the case of all of the above can be found in various industries including, but not limited to, automotive applications, medical applications, consumer and industrial applications, electronic applications. In automotive applications, this may include housings with a silicone seal or gasket, plugs and connectors, components of various sensors, membranes, diaphragms, climate venting components, and the like. Electronic applications may include mobile phone cover seals, mobile phone accessories, precision electronic equipment, electrical switches and switch covers, watches and wristbands, wearable apparatus, e.g. facemasks, wearable electronic devices, and the like.

A composite part may also be selected from parts of mobile phones, mobile telecommunications equipment, gaming machines, clocks, image receivers, DVD equipment, mobile device, media device and mini-disk (MD) equipment, CD equipment, and other precision electronic equipment, microwave ovens, refrigerators, electric rice cookers, TVs, thin displays of liquid crystal TVs and plasma TVs, various home appliance, copying machines, printers, facsimile machines, and other office automation (OA) equipment, connector seals, spark plug caps, components of various sensors, and other automobile components.

EXAMPLES

In the following examples all viscosities were measured using a Brookfield© rotational viscometer using Spindle (LV-4) and adapting the speed (shear rate) according to the polymer viscosity. All viscosity measurements were taken at 25° C. unless otherwise indicated.

TABLE 1 curable silicone elastomer composition used for examples with varying Additives as indicated below

| Ingredient | Part A Comp. (wt. %) | Part B Comp. (wt. %) |
| --- | --- | --- |
| Masterbatch 1 | 50.30 | 50.87 |
| dimethylvinyl-terminated Dimethyl siloxane gum having a Williams plasticity of 156 mm/100 (ASTM D-926-08) | 1.75 | 1.70 |
| Calcium carbonate, fatty acid treated | 17.55 | 17.06 |
| Quartz (average particle size 5 μm) | 5.84 | 5.68 |
| Dimethyl hydroxy terminated Dimethyl siloxane viscosity of about 42 mPa · s | 1.75 | 1.70 |
| Dimethylvinyl terminated Dimethyl siloxane, viscosity of about 57,000 mPa · s | 12.78 | 9.50 |
| Karstedt's (Pt) catalyst in vinyl polymer Dimethyl siloxane, dimethylvinylsiloxy-terminated | 1.69 | — |
| Ethynyl cyclohexanol (ETCH) in Dimethyl, methylvinyl siloxane, dimethylvinylsiloxy-terminated | — | 1.26 |
| Dimethyl, methylvinyl siloxane, dimethylvinylsiloxy-terminated viscosity of about 340 mPa · s | 7.73 | 3.15 |
| Dimethyl, methylhydrogen siloxane, trimethylsiloxy-terminated viscosity of about 12-13 mPa · s | — | 0.66 |

TABLE 1-continued curable silicone elastomer composition used for examples with varying Additives as indicated below

| Ingredient | Part A Comp. (wt. %) | Part B Comp. (wt. %) |
| --- | --- | --- |
| Dimethyl siloxane, hydrogen-terminated viscosity of about 10 mPa · s | — | 5.04 |
| 50 wt % zirconium (IV) acetylacetonate in 50 wt % vinyl terminated polydimethylsiloxane | 0.60 | |
| Additive-see below | | 3.38 |
| Total | (100%) | (100%) |

Masterbatch 1 comprises 68.7% of Dimethylvinyl terminated Dimethyl siloxane, viscosity of about 57,000 mPa·s and 31.3% treated silica.

Three alternative additives were tested.

Additive 1 (Add. 1) was in accordance with the disclosure herein and was a mixture of component (D) structures prepared following the process described in PCT/US Ser. No. 19/064,350, comprising a majority of molecules (approximately 51 to 55%) wherein [Y] is a polymethylphenylsiloxane chain, e is 1, d is zero, m is 2, a is 1 and the value of n is an average between 6 and 7, each cyclic siloxane is an 8 membered ring and it is to be understood that the X group can replace any of the Si—H groups originally positioned in the ring so may be but is not necessarily the following structure. A possible structure for the main ingredient of Additive 1 may be:

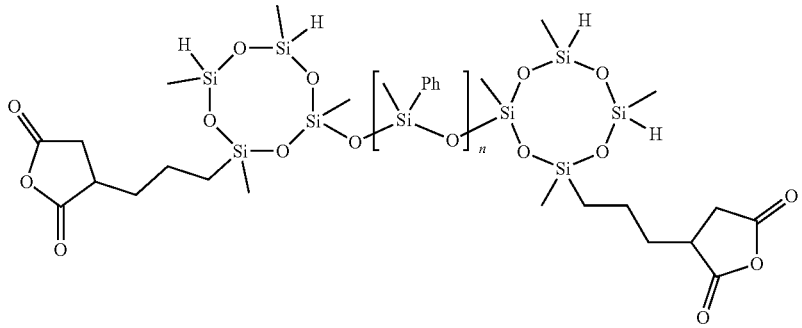

Additive 1 (Example)

The rest being a mixture of analogous molecules in which cyclic siloxanes D in the structure were 10 membered rings (approximately 40 to 45%) and the remainder (approximately >0-5%) had cyclic siloxanes D made of 12 membered rings. The total amount adding up to 100%

Comparative additive 1 (Comp. Add. 1) below is a comparative mixture of oligomers prepared in accordance with the method described in U.S. Pat. No. 7,429,636 comprising a majority of molecules (approximately e.g. 57.5 to 62%) where the number of silicon atoms in the linear chain (n+2 in the above structure) is an average about 7, and each cyclic siloxane is an 8 membered ring. The epoxide group may be linked directly to any of the silicon atoms forming part of the cyclic siloxane and it should be appreciated that the following is merely a representation of one of the options of the main ingredient of Comp. Add. 1

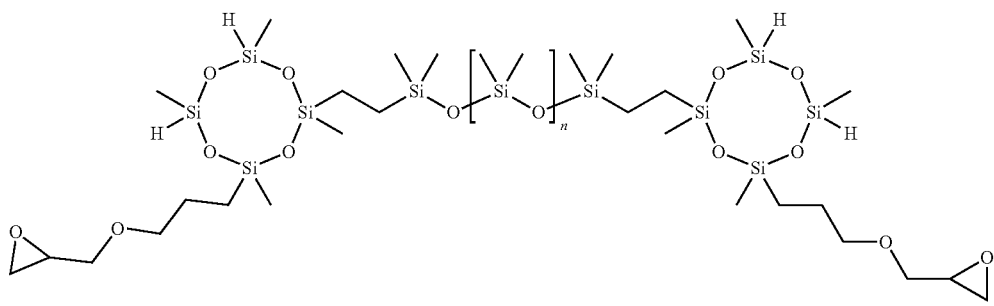

The rest being a mixture of analogous molecules in which each cyclic siloxane cyclic siloxane was a 10 membered ring (approximately 35 to 40%) and the remainder (approximately >0-5%) had cyclic siloxanes made of 12 membered rings. The total amount adding up to 100%

Comparative additive 2 was a mixture similar to Add.1 and prepared in accordance with the process described in PCT/US19/064350 but which has terminal epoxy groups as opposed to anhydride groups comprising a majority of molecules (approximately 51 to 55%) having a structure wherein [Y] is a polymethylphenylsiloxane chain, e is 1, d is zero, m is 2, a is 1 and the value of n is an average between 6 and 7, and it is to be understood that the X group can replace any of the Si—H groups originally positioned in the ring of each cyclic siloxane so the main ingredient of Comparative additive 2 maybe but is not necessarily the following structure

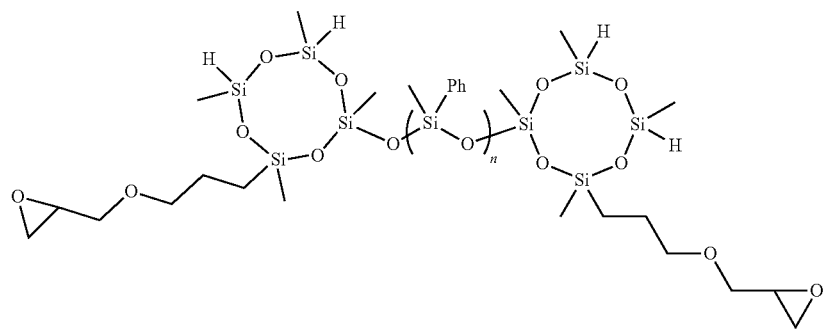

The rest being a mixture of analogous molecules in which cyclic siloxanes in the structure were 10 membered rings (approximately 40 to 45%) and the remainder (approximately >0-5%). The total amount adding up to 100%.

The respective Part A and part B for compositions as depicted in Table 1 above mixed in a 1:1 weight ratio using a speedmixer an slabs of each sample were prepared and then cured at 150° C. for 5 minutes. The physical properties were then determined as depicted in table 2 below. Elongation and Modulus results cured test pieces (ASTM D412-98A) using DIN S2 die and Shore A hardness was determined in accordance with (ASTM D2240-97).

TABLE 2

Physical Properties for compositions containing the respective additives

| | Add. 1 | Comp. Add. 1 | Comp. Add. 2 |
|---|---|---|---|
| Elongation (%) | 900 | 742 | 892 |
| Modulus at 100% elongation (MPa) | 0.4 | 0.94 | 0.63 |
| Modulus at 150% elongation (MPa) | 0.61 | 1.28 | 0.84 |
| Young's Modulus (MPa) | 0.41 | 0.86 | 0.5 |
| Tensile Strength (MPa) | 3.23 | 4.84 | 4.20 |
| Shore A Hardness | 24 | 40 | 33 |

Adhesion Testing

Laminates of 470 dtex polyester and nylon 66 (420 denier, 46×46 thread count) were prepared using the composition as herein before described in Table 1 including the additives discussed above with a view to assessing the Peak adhesion strength with tearing by peeling the laminate apart at one hundred eighty degrees. As well as the peak adhesion strength, an estimation of the percent cohesive failure is reported which was determined by examining the freshly exposed surface at the completion of the test and estimating the percent cohesive failure. The methodology used was based on ASTM D 413-98 with the following differences machine rate, sample width and sample thickness.

The fabric was cut along the weft direction (~12 in) and then in the warp direction (~16 in) to provide substrate sheets (dimensions 12 in (30.48 cm)×16 in (40.64 cm)). All substrates used were pre-dried at 150° C. for one minute in an oven. The fabric was then removed and placed on a workbench. A chase mold was aligned so that it was positioned straight across the fabric in the weft direction (chase used in this study had a 1.16 mm depth [leads to ~1 mm thick adhesive line]; all internal dimensions are 10 mm×10 in). The part A and part B compositions were mixed in a 1:1 weight ratio in a speedmixer.

A plastic spatula was used to fill the chase with the adhesive. The chase was removed, and a second piece of the respective substrate was placed on top of the sample bead. A Styrofoam roller was then used to gently wet-out the bead. The sample was then cured in the oven at 150° C. for 5 minutes.

As will be seen below some substrate samples were plasma treated before use. Plasma treatment took place after the substrate sheets had been oven treated. For plasma treated samples, a mark was made on the fabric at the center of the plasma treating line; albeit the marks were not made where the adhesive was going to be applied. The bottom piece of fabric was plasma treated using an FG3001 plasma generator from Plasmatreat; speed set to 125 mm/s. The robot coordinates were set with x=82.24 mm, y=13.76 mm, z=117 mm; these coordinates lead to a 7 mm gap from plasma treating head to fabric). After treatment the samples were applied following the process above. The second substrate sheet was plasma treated and applied with the plasma treated surface toward the sealant bead. Samples were then cured as described above.

Samples were allowed to sit at room temperature for about 20 hours until analysis was performed. Four samples were cut from each specimen, which consisted of a 10 in seam. The outer 1 in (2.54 cm) of specimen was discarded and four 2 in (5.08 cm) samples were cut. The length of the fabric was then cut to approximately 6 in (15.24 cm) for each sample. The thickness of each sample was measured. This was done by subtracting the width of two pieces of fabric from the width of the overall sample construction.

Peak adhesion strength with tearing by peeling the laminate apart at one hundred eighty degrees. As well as the peak adhesion strength, an estimation of the percent cohesive failure is reported which was determined by examining the freshly exposed surface at the completion of the test and estimating the percent cohesive failure. These were undertaken shortly after cure as discussed above and also after heat and humidity (H & H) aging for 17 days, at 70° C. at 95% relative humidity.

In the case of Peak Load/Width samples were test using an MTS Alliance RF/100 tensile tester The adhesion specimen was placed in the sample holder crosshead speed was set to 8 in/min (200 mm/min) and the Peak Load/Width was determined. Results provided in the Tables below were an average of four data points.

In the case of the cohesive failure measurement this was achieved by analyzing samples pulled Peak Load/Width for percent cohesive failure. A template that contained a 2×10 grid (4 mm×4 mm squares) was placed at the center of the pulled seam, neglecting approximately 5 mm on each side and 2 mm on the top and bottom of the seam. Each square represents a 5% area. The percent cohesive failure was determined for each sample, and then the average was taken of each of the four replicates.

The respective results for 470 dtex polyester substrates and nylon 66 substrates are depicted in Tables 3a-d and 4a-c respectively.

TABLE 3a

Ref. Adhesion test using formulation defined in Table 1 in the absence of any additive as discussed above on a 470 dtex polyester substrate.

| Adhesion Promoter | Treatment | H&H aging | Peak Load/Width (kN/m) | Cohesive failure (%) |
|---|---|---|---|---|
| None | Plasma | No | 0.3 | 0 |

It will be seen that without the additives, although plasma treated minimal adhesion is achieved. The results were so poor that no aging was undertaken.

TABLE 3b

Adhesion test using formulation defined in Table 1 containing Comp. Add. 1 on a 470 dtex polyester substrate.

| Adhesion Promoter | Treatment | H&H aging | Peak Load/Width (kN/m) | Cohesive failure (%) |
|---|---|---|---|---|
| Comp. Add. 1 | Plasma | No | 5.8 | 72 |
| Comp. Add. 1 | Plasma | Yes | 2.3 | 5 |

It can be seen that adhesion was not achieved after aging using comp. Add. 1 even subsequent to plasma treating the substrate surface.

TABLE 3c

Adhesion test using formulation defined in Table 1 containing Comp. Add. 2 on a 470 dtex polyester substrate.

| Adhesion Promoter | Treatment | H&H aging | Peak Load/Width (kN/m) | Cohesive failure (%) |
|---|---|---|---|---|
| Comp. Add. 2 | Plasma | No | 4.8 | 98 |
| Comp. Add. 2 | Plasma | Yes | 2.1 | 3 |
| Comp. Add. 2 | None | No | 4.9 | 86 |
| Comp. Add. 2 | None | Yes | 2.5 | 14 |

Likewise, it can be seen that adhesion was not achieved after aging using comp. Add. 2 either when not plasma treated or subsequent to plasma treating the substrate surface.

TABLE 3d

Adhesion test using formulation defined in Table 1 containing Add.1 on a 470 dtex polyester substrate.

| Adhesion Promoter | Treatment | H&H aging | Peak Load/Width (kN/m) | Cohesive failure (%) |
|---|---|---|---|---|
| Additive 1 | Plasma | No | 5.9 | 100 |
| Additive 1 | Plasma | Yes | 4.9 | 99 |
| Additive 1 | None | No | 5.7 | 100 |
| Additive 1 | None | Yes | 0.6 | 0 |

It can be seen that adhesion was achieved with Additive 1 without plasma treatment although adhesion was lost after the aging process. However, unlike the comparatives above adhesion was retained with respect to substrates subsequent to plasma treating the substrate surface.

TABLE 4a

Ref. Adhesion test using formulation defined in Table 1 in the absence of any additive as discussed above on a Nylon 66 substrate.

| Adhesion Promoter | Treatment | H&H aging | Peak Load/Width (kN/m) | Cohesive failure (%) |
|---|---|---|---|---|
| None | Plasma | No | 0.3 | 0 |

It will be seen that without the additives, although plasma treated minimal adhesion is achieved. The results were so poor that no aging was undertaken.

TABLE 4b

Adhesion test using formulation defined in Table 1 containing Comp. Add. 1 on a Nylon 66 substrate.

| Adhesion Promoter | Treatment | H&H aging | Peak Load/Width (kN/m) | Cohesive failure (%) |
|---|---|---|---|---|
| Comp. Add. 1 | Plasma | No | 5.0 | 68 |
| Comp. Add. 1 | Plasma | Yes | 4.9 | 93 |

A good level of adhesion was retained to plasma treated nylon 66 substrate.

TABLE 4c

Adhesion test using formulation defined in Table 1 containing Add.1 on a Nylon 66 substrate.

| Adhesion Promoter | Treatment | H&H aging | Peak Load/Width (kN/m) | Cohesive failure (%) |
|---|---|---|---|---|
| Additive 1 | Plasma | No | 5.9 | 98 |
| Additive 1 | Plasma | Yes | 4.6 | 98 |
| Additive 1 | None | No | 5.0 | 98 |
| Additive 1 | None | Yes | 3.9 | 73 |

It can be seen that adhesion was achieved with Additive 1 without plasma treatment although adhesion and was substantially retained even after aging. However, unlike the comparatives above adhesion was retained with respect to substrates subsequent to plasma treating the substrate surface.

Adhesion Method and Analysis

In the follow examples depicted in Tables 5a and 5b, the respective substrate utilised was wiped with isopropyl alcohol (IPA) and then air-dried prior to application of the curable silicone elastomer composition. The curable silicone elastomer composition was applied at a thickness of 25 mils (0.635 mm). Subsequently, the curable silicone elastomer composition was cured in a forced air oven at 150° C. for 1 h. Using a razor blade, two perpendicular lines separated by roughly the width of a spatula blade were etched across the width of the substrate and through the depth of cured material down to the substrate surface. Force was applied manually to the cured elastomeric material between the cuts by the spatula held down at approximately an angle of 300 from the substrate surface. Adhesion (or lack of adhesion) was then subjectively assessed and the results are provided in Tables 5a and 5b utilising the following descriptors:

(−) poor adhesion=adhesive failure (separation from the substrate)

(+) moderate to good adhesion=mixed mode failure [cohesive failure (tear in the elastomer) and adhesive failure]

TABLE. 5a

Ref. adhesion test using formulation defined in Table 1 in the absence of any additive, and no surface treatment

| Substrate | Adhesion |
|---|---|
| Lexan ™ 121R (polycarbonate)-Sabic | − |
| Ultramid ® B3EG6 (Nylon 6)-BASF | − |
| Ultramid ® A3EG6 (Nylon 66)-BASF | − |
| Ultradur ® B4300 G4 (PBT)-BASF | − |
| 2024T3 ALCLAD-(aluminium sheet) | − |

TABLE 5b

Adhesion test using formulation defined in Table 1 containing Additive 1

| Substrate | Adhesion |
|---|---|
| Lexan ™ 121R (polycarbonate)-Sabic | + |
| Ultramid ® B3EG6 (Nylon 6)-BASF | + |
| Ultramid ® A3EG6 (Nylon 66)-BASF | + |
| Ultradur ® B4300 G4 (Polybutylene terephthlate)-BASF | + |
| 2024T3 ALCLAD-(aluminium sheet) | + |

The invention claimed is:

1. A curable silicone elastomer composition that can achieve adhesion on plastic/thermoplastic/resin material substrates, the curable silicone elastomer composition comprising:
   (A) one or more organopolysiloxanes containing at least 2 alkenyl and/or alkynyl groups per molecule and having a viscosity in a range of 1,000 to 500,000 mPa·s at 25° C.;
   (B) a curing agent comprising
      (B)(i) an organic peroxide radical initiator; or
      (B)(ii) a hydrosilylation cure catalyst package comprising a hydrosilylation catalyst and an organosilicon compound having at least 2 Si—H groups per molecule, optionally at least 3 Si—H groups per molecule;
   (C) at least one reinforcing filler and optionally one or more non-reinforcing fillers; and
   (D) an organopolysiloxane based additive which comprises at least one Si—H group per molecule, optionally at least two Si—H groups per molecule and which comprises at least two anhydride functional groups per molecule,
   wherein the organopolysiloxane based additive (D) is of the following formula
   $[(XR^3SiO)_a(HR^3SiO)_m(SiR^3O)]$—O—Y—$[(SiR^3O)(OSiR^3H)_m(OSiR^3X)_a]$
   wherein, repeating units in [ ] brackets have a cyclic siloxane structure with the silicon atom in $(SiR^3O)$ connecting the cyclic siloxane structure to the rest of the molecule, each $R^3$ group is an alkyl group containing from 1 to 6 carbons, each X is an anhydride containing group, m is an integer of at least 1, optionally at least 2, a is an integer of at least 1; Y is a linear siloxane group of the structure $(SiPhR^3O)_n$ or $(SiPh_2O)_n$; Ph is a phenyl group and n is an integer of from 2 to 20.

2. The curable silicone elastomer composition in accordance with claim 1, wherein m is 2, a is 1, and the average value of n is between 4 and 10.

3. The curable silicone elastomer composition in accordance with claim 1, wherein the organopolysiloxane based additive (D) is added to the composition in an amount of from 0.5 to 5% by weight of the total composition.

4. The curable silicone elastomer composition in accordance with claim 1, wherein the composition comprises a cure inhibitor.

5. The curable silicone elastomer composition in accordance with claim 1, stored before use in at least 2 separate parts.

6. A process for preparing an article or a composite part of an article, the process comprising:
   a) forming a mixture of the curable silicone elastomer composition according to claim 1;
   b) applying the mixture onto a surface of a substrate; and
   c) curing the mixture at a temperature of from 80 to 250° C.

7. The process in accordance with claim 6, wherein the substrate is a polycarbonate.

8. An article containing a silicone elastomer cured from the curable silicone elastomer composition according to claim 1.

9. The article in accordance with claim 8, wherein the silicone elastomer is adhered to a plastic substrate.

10. The article in accordance with claim 8, wherein the silicone elastomer is adhered to a thermoplastic substrate, an organic resin substrate, or a thermoplastic and organic resin substrate.

11. The article in accordance with claim 8, selected from housings with a silicone seal or gasket, plugs and connectors, components of sensors, membranes, diaphragms, climate venting components, personal electronic equipment, mobile phone cover seals, mobile phone accessories, precision electronic equipment, electrical switches and switch covers, watches and wristbands, or wearable electronic devices.

12. A composite part comprising a silicone elastomer cured from the curable silicone elastomer composition according to claim 1 on a plastic/thermoplastic/resin material substrate, optionally on a polycarbonate material substrate.

13. The composite part in accordance with claim 12, selected from housings with a silicone seal or gasket, plugs and connectors, components of sensors, membranes, diaphragms, climate venting components, personal electronic equipment, mobile phone cover seals, mobile phone accessories, electronic equipment, electrical switches and switch covers, watches and wristbands, wearable apparatus and/or wearable electronic devices, parts of mobile phones, mobile telecommunications equipment, gaming machines, clocks, image receivers, DVD equipment, MD-media device and mini-disk equipment, CD equipment, microwave ovens, refrigerators, electric rice cookers, cathode ray TVs, thin displays of liquid crystal TVs and plasma TVs, home appliances, copying machines, printers, facsimile machines, and office automation equipment, connector seals, spark plug caps, and automobile components.

* * * * *